(12) United States Patent
Theroux et al.

(10) Patent No.: US 8,949,457 B1
(45) Date of Patent: Feb. 3, 2015

(54) LOCAL TRANSPARENT EXTENSIBILITY AND ROUTING SLIP EXTENSIBILITY FOR BUSINESS PROCESS EXECUTION LANGUAGE

(75) Inventors: Michael E. Theroux, Bedford, MA (US); Andi Abes, Bedford, MA (US); Peter Stewart Easton, Bedford, MA (US); Gregory M. Lucas, Bedford, MA (US)

(73) Assignee: Aurea Software, Inc., Austin, TX (US)

( * ) Notice: Subject to any disclaimer, the term of this patent is extended or adjusted under 35 U.S.C. 154(b) by 936 days.

(21) Appl. No.: 12/044,751

(22) Filed: Mar. 7, 2008

Related U.S. Application Data

(60) Provisional application No. 60/893,806, filed on Mar. 8, 2007.

(51) Int. Cl.
*G06F 15/173* (2006.01)
*G06F 13/00* (2006.01)
*H04L 29/12* (2006.01)
*G06F 5/01* (2006.01)
*H04L 12/28* (2006.01)

(52) U.S. Cl.
CPC ......... *H04L 61/1535* (2013.01); *H04L 61/1552* (2013.01); *H04L 61/2557* (2013.01); *G06F 5/01* (2013.01); *H04L 61/10* (2013.01); *H04L 12/2865* (2013.01)
USPC .......................................... 709/238; 719/313

(58) Field of Classification Search
CPC ....... G06F 5/01; H04L 12/2865; H04L 61/10; H04L 61/1535; H04L 61/1552; H04L 61/2557
USPC ............................ 709/206, 226, 238; 719/313
See application file for complete search history.

(56) References Cited

U.S. PATENT DOCUMENTS

| | | | | |
|---|---|---|---|---|
| 7,039,671 | B2 * | 5/2006 | Cullen | 709/201 |
| 2003/0097286 | A1 * | 5/2003 | Skeen | 705/7 |
| 2004/0103413 | A1 * | 5/2004 | Mandava et al. | 718/100 |
| 2004/0110497 | A1 * | 6/2004 | Little | 455/418 |
| 2004/0111466 | A1 * | 6/2004 | Beringer et al. | 709/203 |
| 2006/0112367 | A1 * | 5/2006 | Harris | 717/100 |
| 2006/0123128 | A1 * | 6/2006 | Feingold et al. | 709/230 |
| 2008/0120607 | A1 * | 5/2008 | Dippel | 717/137 |
| 2008/0154663 | A1 * | 6/2008 | Savur et al. | 705/7 |
| 2011/0196940 | A1 * | 8/2011 | Martinez et al. | 709/217 |

* cited by examiner

Primary Examiner — Brian J Gillis

(57) ABSTRACT

In order to achieve location transparency and routing slip extensibility, a system and a method for orchestrating a web service using Business Process Execution Language are disclosed. The method includes: receiving a message, wherein the message comprises an address identifying an extension element; determining, from the address, a location of the extension element identified by the address; responsive to determining the location of the extension element, directing the message to an appropriate location; and storing the message in a computer readable storage medium.

32 Claims, 8 Drawing Sheets

LOCAL TRANSPARENT EXTENSIBILITY AND ROUTING SLIP EXTENSIBILITY FOR BUSINESS PROCESS EXECUTION LANGUAGE

CROSS REFERENCE TO RELATED APPLICATIONS

This application claims the benefit of U.S. Provisional Patent Application No. 60/893,806, filed Mar. 8, 2007, and titled "Business Process Execution Language with Location Transparent Extensibility and Routing Slip Extensibility," the contents of which are hereby incorporated by reference.

BACKGROUND

1. Field of Art

The disclosure generally relates to the field of Web Service orchestration, and more specifically to, Business Process Execution Language (BPEL) for Web Service orchestration and its extensibility and scalability.

2. Description of the Related Art

Web Services, software systems designed to support interoperable machine to machine interaction over a network, have become an increasingly accepted mechanism of providing functionality across increasingly heterogeneous business systems and environments. Existing standards, such as the Web Service Description Language (WSDL) established by the World Wide Web Consortium (W3C), provide mechanisms of describing the interface of a Web Service. Standards also describe the protocol used to communicate between services and clients, including content of transport messages, such as Simple Object Access Protocol (SOAP) and Hypertext Transfer Protocol (HTTP).

The Business Process Execution Language (BPEL) has emerged as one of the leading standards in the area of web service orchestration. BPEL is an XML based language for defining an executable process composed of web service operations. BPEL has many traditional programming constructs, such as variables and conditionals, as well as constructs for interacting with Web Services, such as receives, invokes, and WSDL message variable types. BPEL builds upon these constructs to allow complex correlation and compensation semantics that are invaluable when orchestrating Web Services. With BPEL, users can compose existing Web Services to implement new, more complex Web Services.

Although BPEL is well suited for sophisticated Web Service orchestration, it lacks the necessary constructs and libraries to directly implement complex business logic. The BPEL specification does not provide the capability to implement methods and code libraries, but rather relies on externally defined and managed Web Service implementations.

A typical BPEL use case requires some new custom business logic in addition to the Web Services being orchestrated. Many BPEL vendors address this need by providing their own mechanism to extend BPEL via custom code extensions (such as JAVA). However, the use of extensibility mechanisms introduces other problems in and of itself. These code extensions must be co-located on the same physical computer as the BPEL processing engine executing the process definition. As a result they compete for resources (such as memory, CPU cycles or network bandwidth) with each other and with the BPEL processing engine itself. Further, BPEL is designed to orchestrate Web Service requests from a centralized location. It is extremely difficult for a single BPEL process instance to, itself, be distributed across multiple computer systems.

SUMMARY

In order to achieve location transparency and routing slip extensibility, a system and a method for orchestrating a Web Service using Business Process Execution Language are disclosed. The method includes: receiving a message, wherein the message comprises an address identifying an extension element; determining, from the address, a location of the extension element identified by the address; responsive to determining the location of the extension element, directing the message to an appropriate location; and storing the message in a computer readable storage medium.

In some embodiments, directing the message to an appropriate location includes mapping the address to a Message Oriented Middleware (MOM) destination. In other embodiments, directing the message to an appropriate location includes resolving the address to a list of addresses known as an itinerary or a routing slip. In yet other embodiments, the method further comprises determining whether a response is required and annotating the message with a reply requirement annotation.

The embodiments described herein help to achieve location transparency and scalability. Regardless of physical location of the extension, the extension can be executed as orchestrated by the BPEL process without modification of the extension or the BPEL process or any other aspect of the BPEL execution environment. Location transparency allows this extension to be co-located with the BPEL engine or located on a separate physical computer, thereby increasing the amount of computing resources available to the problem. The extension can be moved from computer to computer dynamically without visibility to the BPEL process. In addition, via the use of this invention, many copies of the extension can be placed on many physical computers allowing load-balancing of the code extension without the need for expensive, third-party, load balancers.

The disclosed embodiments allow users to define BPEL processes that execute either on a single piece of hardware or across many systems, without modification of the BPEL process or the services which they invoke. This allows dynamic distribution of a user's business process logic by simply changing the location of extension elements. This gives users a tremendous amount of control and flexibility on where logic is executed. This invention also allows the user to provide fine-grained scalability to elements of the BPEL process instances. Finally, one of the benefits of this approach is providing the user with an avenue to scale-out (horizontal scalability) as opposed to other approaches, which only allow the user to scale-up (vertical scalability).

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
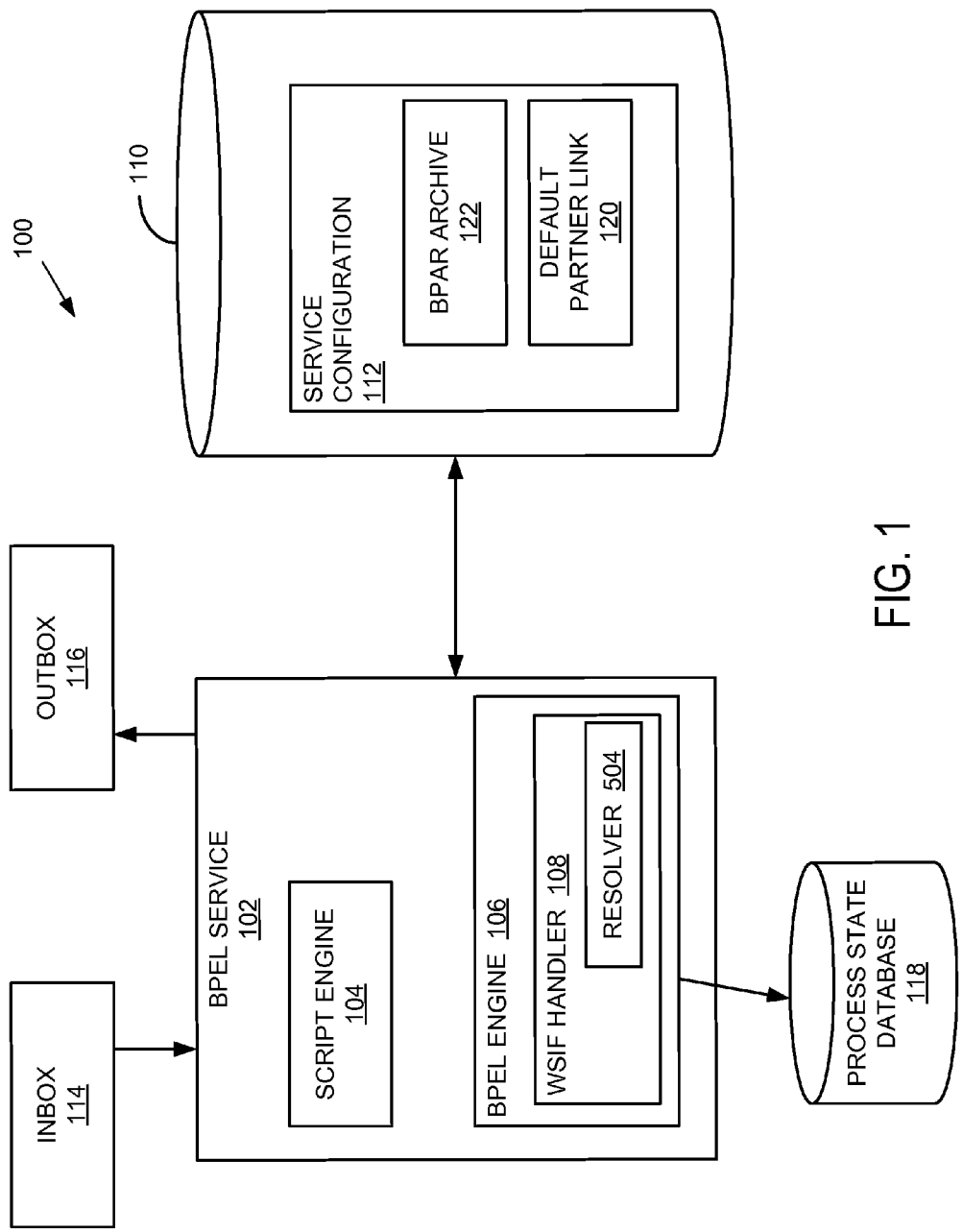
FIG. 1 is a high level block diagram illustrating the system architecture of the BPEL service in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 is a block diagram illustrating the system architecture 100 for the BPEL service 102 in accordance with some embodiments. The system 100 comprises a BPEL service 102 that includes a script engine 104 and BPEL engine 106. The BPEL engine 106 comprises a Web Services Invocation Framework Handler (WSIF handler) 108. The WSIF handler 108 comprises a resolver 504.

In some embodiments, the BPEL service 102 is an enterprise service bus (ESB) service that executes BPEL process definitions and manages process instances. In one embodiment, the ESB service provides foundational services for more complex architectures via an event-driven and standards-based messaging engine. The ESB service removes the coupling between the service called and the transport medium, and is typically standards-based and flexible, supporting many transport mediums. An ESB service generally provides an abstraction layer on top of an implementation of an enterprise messaging system, which allows integration architects to exploit the value of messaging without writing code.

In one embodiment, the BPEL service 102 is responsible for dispatching messages to the BPEL engine 106, handling replies and fault messages, and providing an invocation layer through which a process can invoke an ESB service, ESB itinerary or external web service. An ESB itinerary is a list of ESB services. The BPEL service 102 receives messages at an entry endpoint and dispatches them to the BPEL engine 106.

The BPEL service includes a script engine 104 and BPEL engine 106. The script engine 104 parses and processes the command definition, if any, associated with an incoming BPEL input message. The script engine 104 supports facilities for mapping between script variables and WSDL parameters. The input message passes directly to the BPEL engine 106 with no intermediary format, such as SOAP. If a response is returned from the BPEL engine 106, it is processed according to the script command to produce an output message that will be place in the outbox 116.

In some embodiments, the system 100 comprises a directory service 110 adapted to communicate with the BPEL service 102. The directory service 110 comprises service configuration 112. Each instance of the BPEL service 102 hosts an instance of the BPEL engine 106 and is configured by the service configuration 112. The service configuration 112 references a business process archive (BPAR archive) 122 that includes one or more process definitions to be executed by the BPEL service 102. The BPAR archive 122 is an archive for deploying BPEL process definitions and related artifacts to the BPEL engine 106. In some embodiments, related artifacts are deployment descriptors and WSDL files. An archive may include many process definitions.

In one embodiment, the directory service 110 comprises a non-volatile storage device, such as a hard disk drive, a flash memory device or other persistent storage device. Alternatively, the directory service 110 comprises a volatile storage device such as dynamic random access memory (DRAM), static random access memory (SRAM) or another suitable memory device. In another embodiment the directory service 110 comprises a combination of a non-volatile storage device and a volatile storage device.

In some embodiments, the BPEL service 102 is adapted to communicate with an inbox 114, from which input messages are received, and an outbox 116, to which output messages are sent. In one embodiment, the BPEL service 102 is also adapted to communicate with a process state database 118.

In one embodiment, a network (not shown) is used to transmit data or instructions between or among BPEL service 102, the directory service 110, inbox 114 and outbox 116. The network may comprise a conventional wireless data communication system, for example, general packet radio service (GPRS), IEEE 802.11 (or WiFi), IEEE 802.16 (or WiMax), Bluetooth or any other suitable wireless communication system. In an embodiment, the network comprises a combination of a wireless communication system and a wired communication system. Alternatively, the network is replaced by a peer-to-peer configuration where the computing BPEL service 102, the directory service 110, inbox 114 and outbox 116 directly communicate with each other.

In one embodiment, the network uses standard communications technologies and/or protocols. Thus, the network can include links using technologies such as Ethernet, integrated services digital network (ISDN), digital subscriber line (DSL), asynchronous transfer mode (ATM), InfiniBand, PCI Express Advanced Switching or any other suitable wired communication system. Similarly, the networking protocols used on the network can include multiprotocol label switching (MPLS), the transmission control protocol/Internet protocol (TCP/IP), the User Datagram Protocol (UDP), the hypertext transport protocol (HTTP), Real-time Transport Protocol (RTP), Rapid Spanning Tree Protocol (RSTP), etc. The data exchanged over the network can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network can also include links to other networks such as the Internet.

For purposes of illustration, FIG. 1 shows the BPEL service 102, script engine 104, BPEL engine 106, WSIF handler 108, resolver 504, service configuration 112, inbox 114, outbox 116, default partner link 120 and BPAR archive 122 as discrete modules. However, in various embodiments, any or all of the BPEL service 102, script engine 104, BPEL engine 106, WSIF handler 108, resolver 504, service configuration 112, inbox 114, outbox 116, default partner link 120 and/or BPAR archive 122 can be combined. This allows a single module to perform the functions of one or more of the above-described modules.

Figure 2:
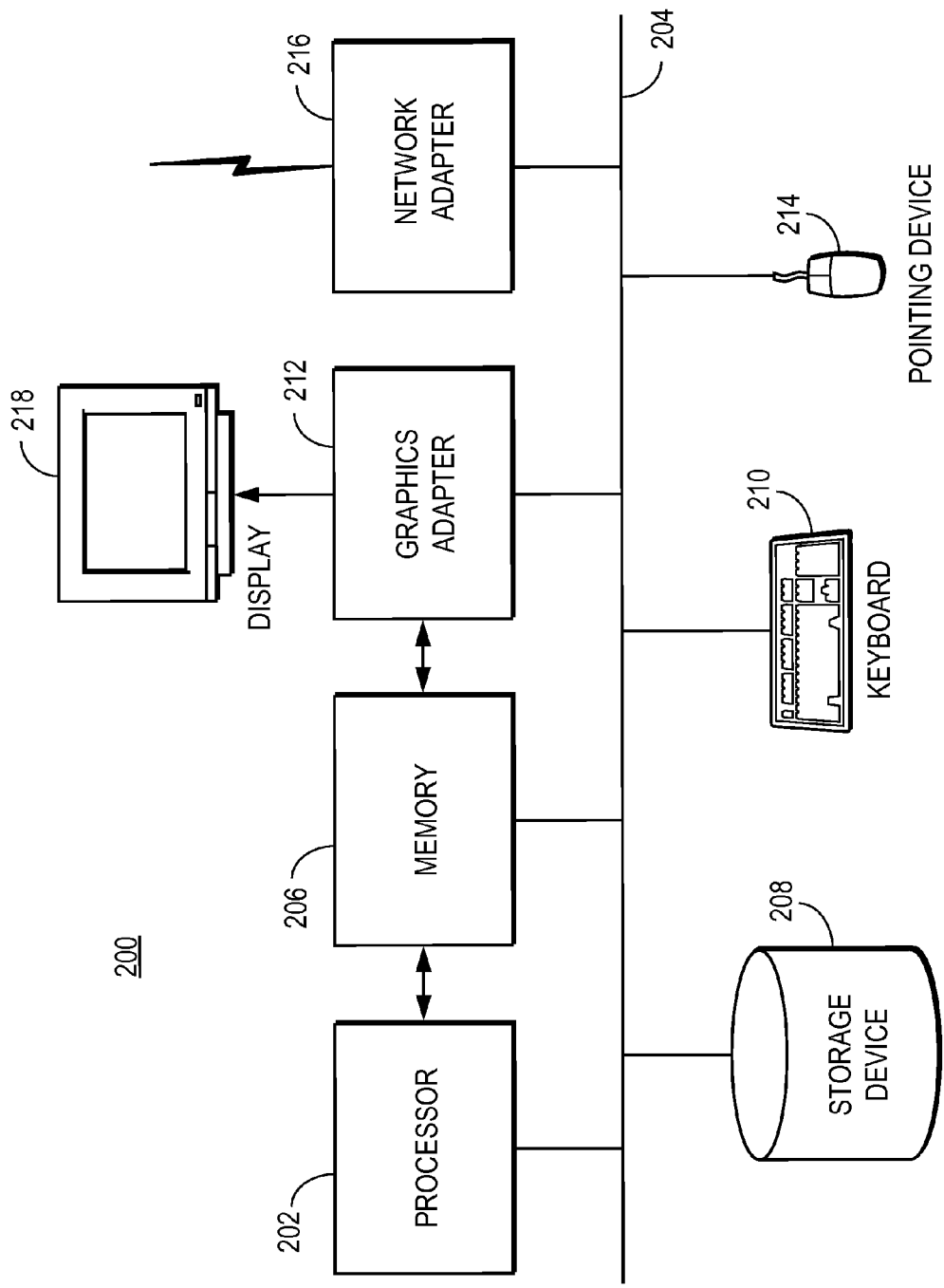
FIG. 2 is a high level block diagram illustrating a functional view of a typical computer for use as one or more the entities illustrated in the system of FIG. 1 according to one embodiment.

FIG. 2 is a high level block diagram illustrating a functional view of a typical computer 200 for use as one or more the entities illustrated in the system 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214 and a network adapter 216. In one embodiment, the functionality of the bus 204 is provided by an interconnecting chipset. A display 218 is coupled to the graphics adapter 212.

The processor 202 may be any general-purpose processor such as the INTEL x86 compatible CPU. In one embodiment, the storage device 208 is any device capable of holding data, like a hard drive, compact disk read-only memory (CD-ROM), DVD or a solid-state memory device. The memory 206 holds instructions and data used by the processor 202. The pointing device 214 may be a mouse, track ball or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a managed node lacks a keyboard 210, pointing device 214, graphics adapter 212 and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware and/or software. In one embodiment, program modules are stored on the storage device 208, loaded into the memory 206, and executed by the processor 202.

Embodiments of the entities described herein can include other and/or different engines or modules than the ones described here. In addition, the functionality attributed to the engines or modules can be performed by other or different engines or modules in other embodiments. Moreover, this description occasionally omits the term "module" for purposes of clarity and convenience.

Figure 5:
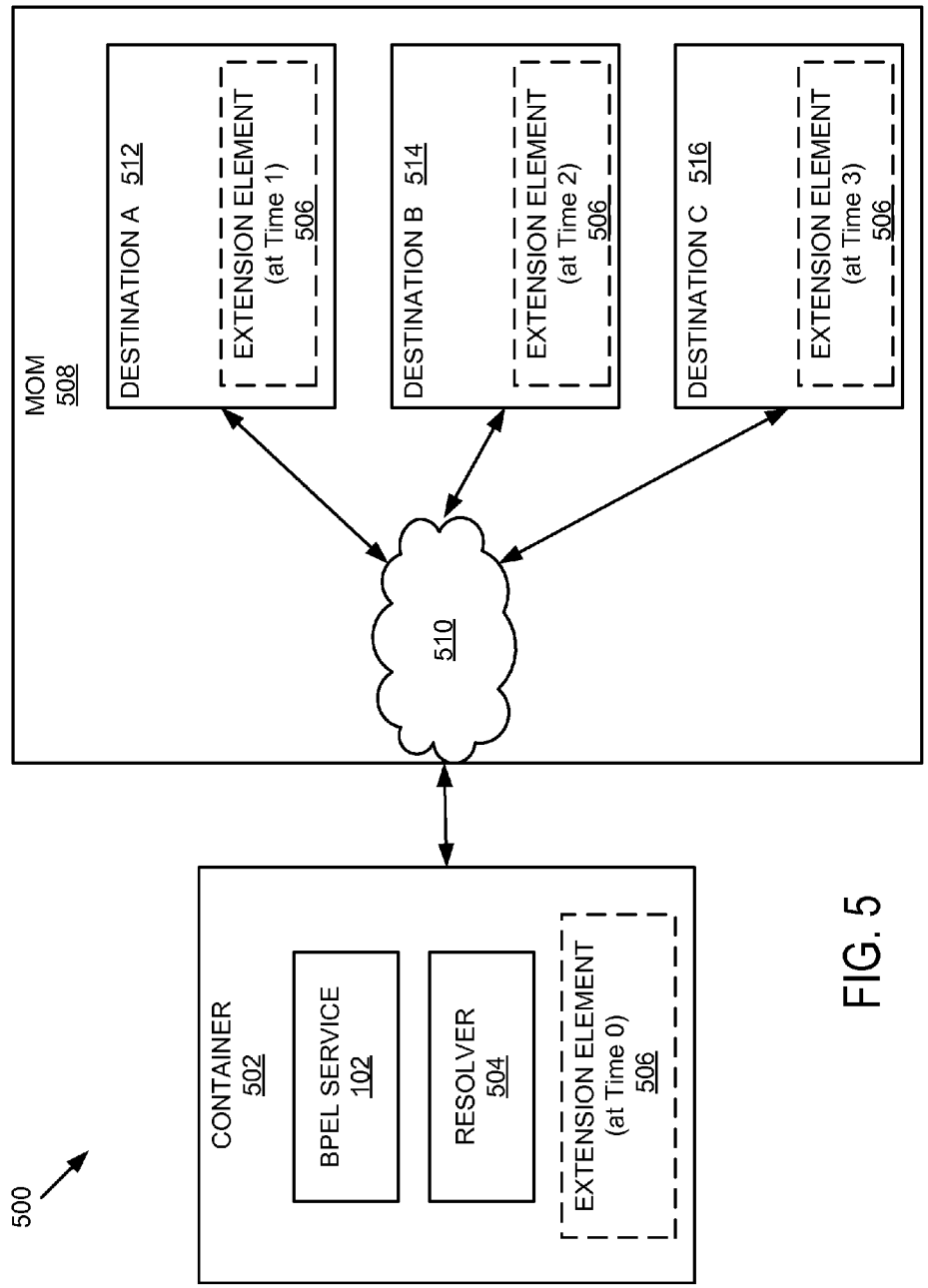
FIG. 5 is a functional block diagram illustrating example movement of an extension element to various destinations in MOM in accordance with one embodiment.

FIG. 5 is a functional block diagram illustrating an example of movement of an extension element 506 from various destinations 512, 514 and 516 in Message Oriented Middleware (MOM) 508 at different times. As shown in FIG.

5, a container 502 includes a BPEL service 102, a resolver 504 and an extension element 506. The container 502 is adapted for communication with MOM 508. The MOM 508 includes a network 510 that couples a plurality of destinations (a sample few of which are shown) 512, 514 and 516.

In one embodiment, an extension element 506 is an implementation of the additional logic a developer wishes to add to the BPEL execution. This could be code written in Java or C++, however these specific languages are not required. Every extension element 506 is associated with or assigned a unique address that is, in some embodiments, associated with a destination on a MOM 508. In some embodiments, the address is a URL that the container 502 will resolve to a Topic or Queue destination, but may also be used to identify the extension element 506 uniquely within the container 502. Extension elements 506 are associated with a WSDL describing the interface of the extension element 506. The interface includes an operation and WSDL message. As specified by WSDL 1.1, a WSDL message would be associated with zero or more named parts. The extension element 506 is written to receive a normalized message (discussed below) that corresponds to its WSDL definition. The extension element 506 can receive the normalized message directly, or optionally the normalized message can be received as a method call with parameters, where named parts are represented as named parameters. If a response is required, the extension element 506 returns a normalized message that corresponds to its WSDL definition, or optionally can return parameters that represent the named parts of the WSDL Message.

In one embodiment, the container 502 is the computer process in which the BPEL environment resides. The container 502 could be a Java Virtual Machine, C/C++ application, or any other similar environment. The container 502 includes one or more instances of 102, described in FIG. 1, which is responsible for executing the BPEL process definition. The container 502 also has knowledge of extension elements. A container 502 can host and manage extension elements which reside in it. The container 502 has capabilities to utilize MOM 508 to send and receive messages on behalf of extension elements 506.

MOM 508 includes various destinations 512, 514 and 516 where the extension element 506 may reside. The MOM 508 is a loosely coupled communications mechanism in which clients communicates via an abstract "Topic" or "Queue" destination to another client. A "Topic" represents a publish/subscribe mechanism in which a message sent to a topic can be delivered to multiple message consumers. A "Queue" represents a mechanism in which a message sent to a queue will only be delivered to a single message consumer. If many consumers exist, only one of the many consumers will receive the message (typically via a load-balancing heuristic).

The resolver 504, in some embodiments, is a map of logical addresses to physical addresses, which in some embodiments are Message Oriented Middleware 508 destinations. This is used by the container 502 to resolve addresses for delivery. In some embodiments, a normalized message is a representation of a message as described in WSDL. A normalized message in WSDL 1.1 consists of zero or more named parts. A normalized message can be serialized across a network between computers. Many potential representations of the normalized message exist, such as SOAP or MIME. An address can resolve to a specific MOM destination 512, 514, or 516. However, the resolver 504 can also resolve a logical address to an itinerary, which is a sequence of addresses. Only the first and last extension elements in the sequence need to conform to the request and response interfaces of the WSDL. All intermediary addresses are opaque extension elements that do not need to conform to any interfaces specified by BPEL. In yet other embodiments, and address can resolve to an extension available locally in the same container, and the normalized message is directly delivered to it, without requiring serialization or the use of the MOM.

In one embodiment, opaque extension elements are similar to the extension elements discussed above, except they are not associated with a WSDL interface. BPEL prescribes via standard mechanisms how to interact and manipulate data sent to and retrieved from WSDLs. In some embodiments, opaque extensions elements never interact directly with BPEL, therefore are not required to define a WSDL (although are not restricted from doing so). Opaque extension elements could include transformation steps, custom code extensions, calls to other BPEL processes, etc. Itineraries are synonymous with routing slips. In some embodiments the itinerary may support additional constructs such as conditional or fan-out behavior to augment the sequence of addresses.

As shown in FIG. 5, the extension element 506 may move at different times from the container 502 to destination A 512, destination B 514 or destination C 516 in MOM 508 via a network 510. The location of the extension element 506 in FIG. 5 is only by way of example, and those skilled in the art will recognize that any various changes in location for the extension element 506 are possible. The present invention advantageously provides location transparency such that regardless of where the extension element 506 is physically located, the BPEL service 102 can execute the extension element 506 without modification to either the BPEL service 102 or the extension element 506. Thus, the extension element 506 can be moved dynamically from various locations according to other needs, such as load balancing of the system. For example, as shown in FIG. 5, at time 0, the extension element 506 is located and operating in the container 502. The resolver 504 maps the logical address of the extension element 506 to a physical location of the container 502. The extension element 506 is shown with dashed lines to indicate it is only at the container 502 from time 0 to time 1. As some later time, time 1, the extension element 506 is moved from the container 502 to destination A 512. The extension element 506 is shown as part of destination A 512 with dashed lines to indicate it is only there from time 1 to time 2. If the extension element 506 is accessed by the BPEL service 102 during time 1 to time 2, the resolver 504 maps the logical address of a physical location at destination A 512. Similarly, the extension element 506 may have a physical location at destination B 514 from time 2 to time 3; and a physical location at destination C 516 after time 3. In such cases, the resolver 504 maps the logical address to a physical location so that neither the BPEL service 102 nor the extension element 506 needs to manage or process changes to the physical location of the extension element 506. In some embodiments, the extension element 506 may move from the container 502 to a destination 512, 514 or 516 on the MOM 508 via broker services.

System Operation

Figure 3:
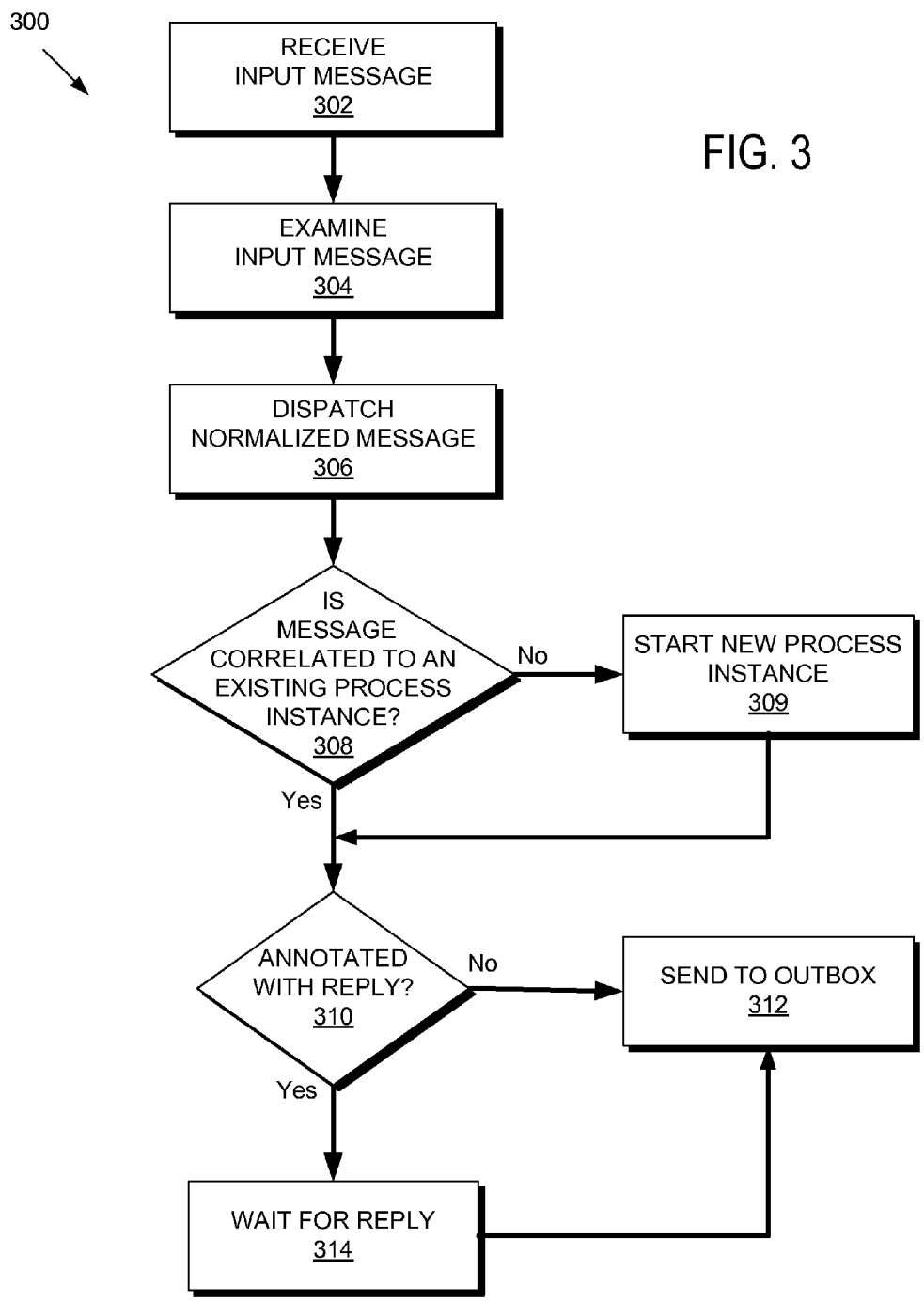
FIG. 3 is a flow diagram illustrating the process of the BPEL service in accordance with some embodiments.

FIG. 3 is a flow diagram illustrating a process 300 of the BPEL service 102 in accordance with some embodiments. Those of skill in the art will recognize that other embodiments can perform the steps of FIG. 3 in different orders or include different and/or additional steps than the ones described herein.

As shown in FIG. 3, an input message is received at step 302 by the BPEL service 102. In some embodiments, the BPEL service 102 receives an input message that specifies a script command describing a mapping of the input message to the corresponding WSDL invocation. In that case, the input message is processed by the script engine 104 to produce the normalized WSDL message. In other embodiments, the input message may include a SOAP envelope or other common format that can be directly mapped to the WSDL normalized message.

The BPEL service 102 examines at step 304 the input message to convert it to a normalized message and determines how best to dispatch the normalized message for processing. In this examining step 304, the input message is converted to a normalized format, such as a WSDL format. In some embodiments, if the input message has a SOAP envelope that SOAP message can be passed directly to the BPEL engine 106 or remote destination. In some embodiments, BPEL service 102 supports the following SOAP bindings: document/literal; RPC/literal; and RPC/encoded. The BPEL service 102 examines the input message to identify its external message format, and then converts the input message to the appropriate normalized message, such as a normalized WSDL message. In this examining step 304, a determination is made as to whether the extension element 506 is required to process a request in the input message is available locally in which case it is invoked by the BPEL engine 106, or is available remotely in which case a normalized message including the request from the input message is sent to another container that can deliver the normalized message to the remote extension element for processing. In one embodiment, this is done by examining an address (e.g., a logical address for the extension element 506) included in the input message. Example embodiments of this process are described in more detail below with reference to FIGS. 4A and 4B.

Next, the method dispatches 306 the normalized message based on the examining step 304. The normalized message can be either dispatched to the BPEL engine 106 for local processing or to a remote destination address for processing by another container and/or BPEL engine.

If the normalized message is processed locally by the BPEL engine 106, then the BPEL engine 106 next determines in step 308 if the normalized message is correlated to an existing process instance, as defined by the BPEL specification. If not (308—No), a new process instance is started in step 309 after which the process continues in step 310. If the normalized message is correlated to an existing process instance (308—Yes), that existing process is used to execute the normalized message and the process continues to step 310 to determine whether an annotated reply was requested by the input message. If a response is not expected (310—No), then the normalized message is converted to an output message and sent 312 to the outbox 116 (as an output message). If a response is expected, then the normalized message is converted to an output message and is annotated with a reply (310—Yes). In one embodiment, a BPEL service listener thread waits in step 314 for a reply from the extension element 506 and blocks the dispatching of the output message to the outbox 116 until a response is received. Once the response is received, it is added to the output message, and the output message is sent 312 to the outbox 116. Once created or if already existing, a BPEL process instance may invoke a WSDL-described extension element 506 identified by a BPEL construct called a "partner link."

Based on the above description, those skilled in the art will understand that if the normalized message is processed remotely by another BPEL engine because the extension element 506 is at a remote location and is itself a BPEL engine, that other (remote) BPEL engine follows a process similar to that described above with reference to steps 308, 309, 310, 312 and 314. In one embodiment, the other (remote) BPEL engine is responsible for creating and sending the output message, if needed. In another embodiment, the other (remote) BPEL engine sends a reply normalized message back to the BPEL engine 106 that performs steps 314 and 312 by incorporating the reply into the output message.

Figure 4A:
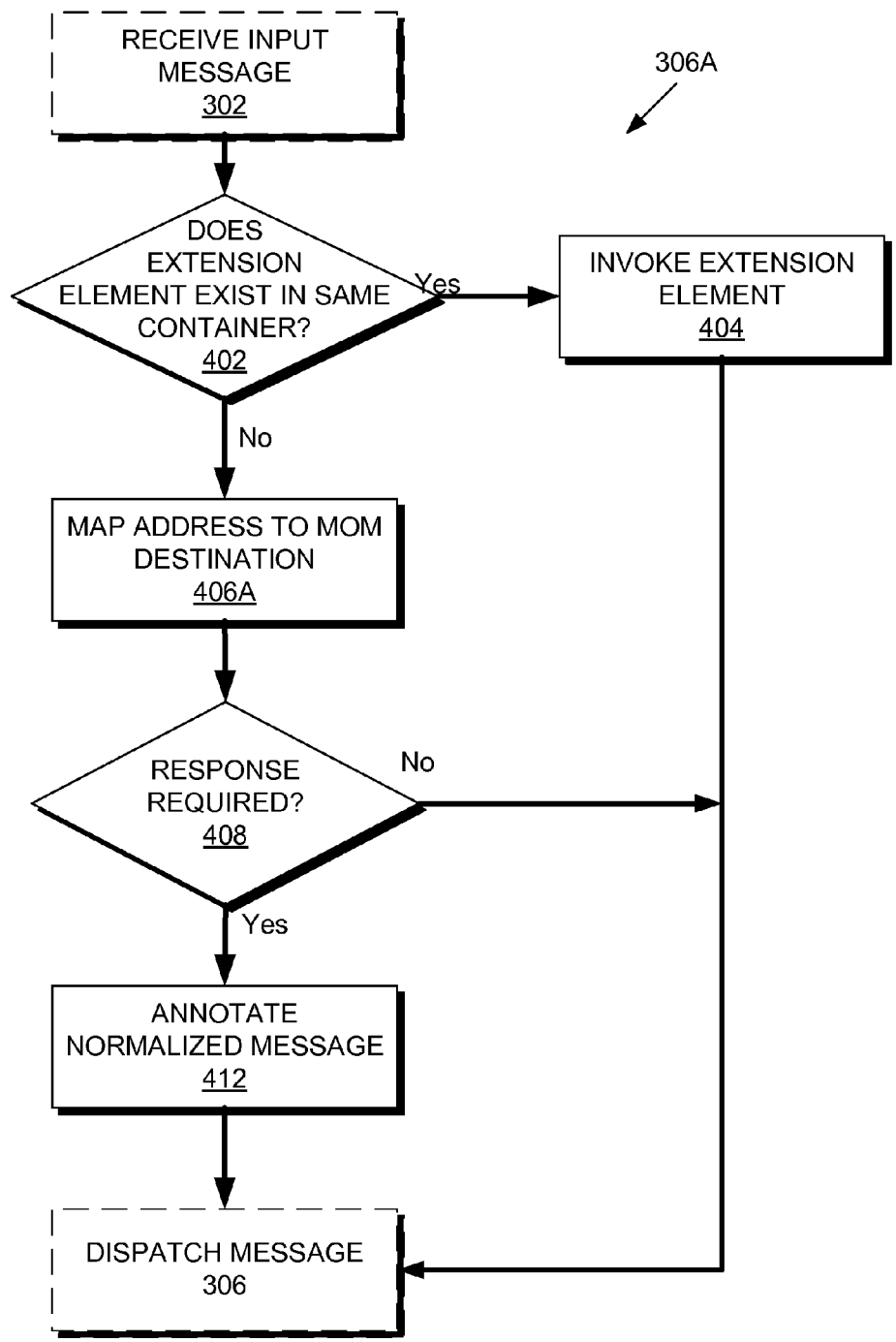
FIG. 4A is a flow diagram illustrating the process of examining an input message received by the BPEL service in accordance with some embodiments.

FIG. 4A is a flow diagram illustrating the process 306A by which the BPEL service 102 examines 306 an input message and generates an normalized message in accordance with some embodiments. In some embodiments, the process begins when the input message is received 302 and passed to a WSIF handler 108 for delivery to an address (e.g., a logical address). A determination is made 402 as to whether the addressed extension element 506 exists within the current container 502. If the extension element 506 exists within the container 502 (402—Yes), the extension element 506 is invoked 404 immediately within the same container 502 and the normalized message is passed/dispatched 306 to the extension element 506 for processing. As shown in FIG. 3, if the operation being invoked requires a response, the extension element 506 then returns a normalized message including the response immediately to the BPEL process. This in turn can be converted by the BPEL service 102 to an output message and sent to the outbox 116.

However, if the extension element 506 does not exist in the same container 502 as the BPEL service 102 (402—No), the resolver 504 maps 406A the logical address to a MOM destination. A determination 408 is then made as to whether the input message requires a response (e.g., the operation being invoked by the input message requires a response). If the operation being invoked does not require a response (408—No), the BPEL service 102 generates a normalized message to the destination identified in step 406A that can be sent/dispatched 306 to the destination where the extension element 506 is located. The normalized message when executed at the receiving destination or BPEL service will invoke the extension element 506 at the mapped destination. If the operation being invoked requires a response (408—Yes), the normalized message is annotated 412 with an indicator specifying that a reply is required and correlation information for the remote container. The normalized message is then sent/dispatched 306 to that destination to be retrieved by another container (not shown). In some embodiments, the normalized message is sent to the outbox 116 for delivery to the other container. The other container retrieves the normalized message and delivers it to the extension element 506. If a response is required, the extension element returns a normalized message. In one embodiment, the extension element returns a normalized message corresponding to its defined WSDL interface. The container then takes the response and sends it to the destination indicated in the reply.

Figure 4B:
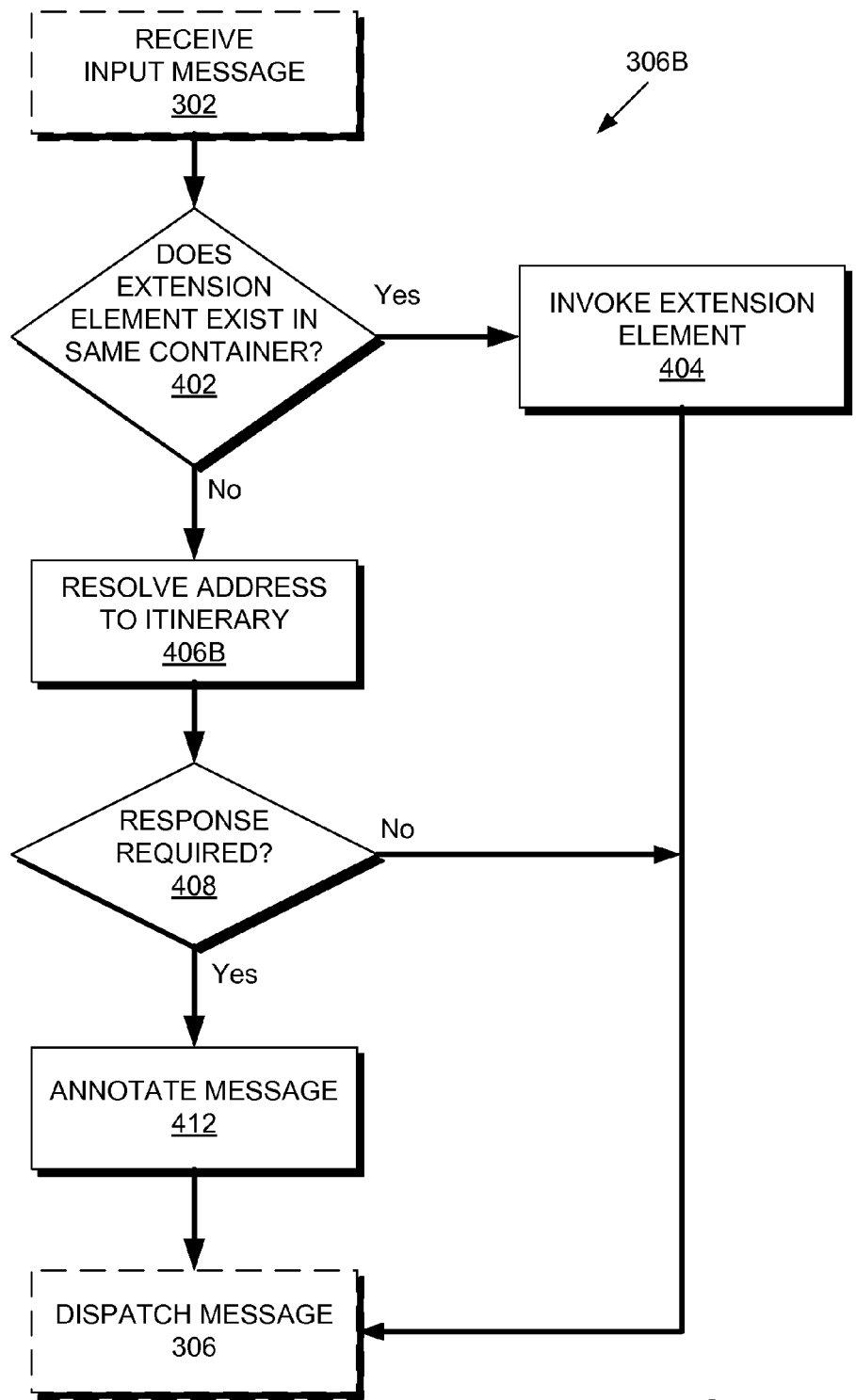
FIG. 4B is a flow diagram illustrating the process of examining an input message received by the BPEL service in accordance with another embodiment.

FIG. 4B is a flow diagram illustrating another embodiment of a process 306B by which the BPEL service 102 examines 306 an input message and generates an normalized message in accordance with some embodiments. Similar to process 306A above, a determination is made 402 as to whether the extension element 506 exists within the container 502. If the extension element 506 exists within the container 502 (402—Yes), the extension element 506 is invoked 404 immediately within the same container 502 and the normalized message is passed/dispatched 306 to the extension element 506 for processing.

In some embodiments, as shown in FIG. 4B, the extension element 506 does not exist in the same container 502 as the BPEL engine 106 (402—No). The resolver 504 resolves 406B the address to an itinerary or routing slip, which is a list of addresses. A determination 408 is then made as to whether the input message requires a response. If the operation being invoked requires a response (408—Yes), the normalized message is annotated 412 with REPLY and correlation information. The normalized message is then sent/dispatched 306 to a destination/address specified by the itinerary to be processed by another container and dispatched to the extension element 506.

After step 306 of FIG. 4B, as shown in FIG. 3, the extension element 506 then manipulates the normalized message for further processing by other extension elements. After the extension element 506 has completed processing, the result of the extension element 506 is a normalized message. The normalized message and the next address in the itinerary is given to the container and the process continues. Addresses can also resolve to additional itineraries recursively. Finally, it is possible based on the itinerary definition for multiple addresses to be resolve simultaneously, allowing multiple extension elements to be executed in parallel.

Figure 6:
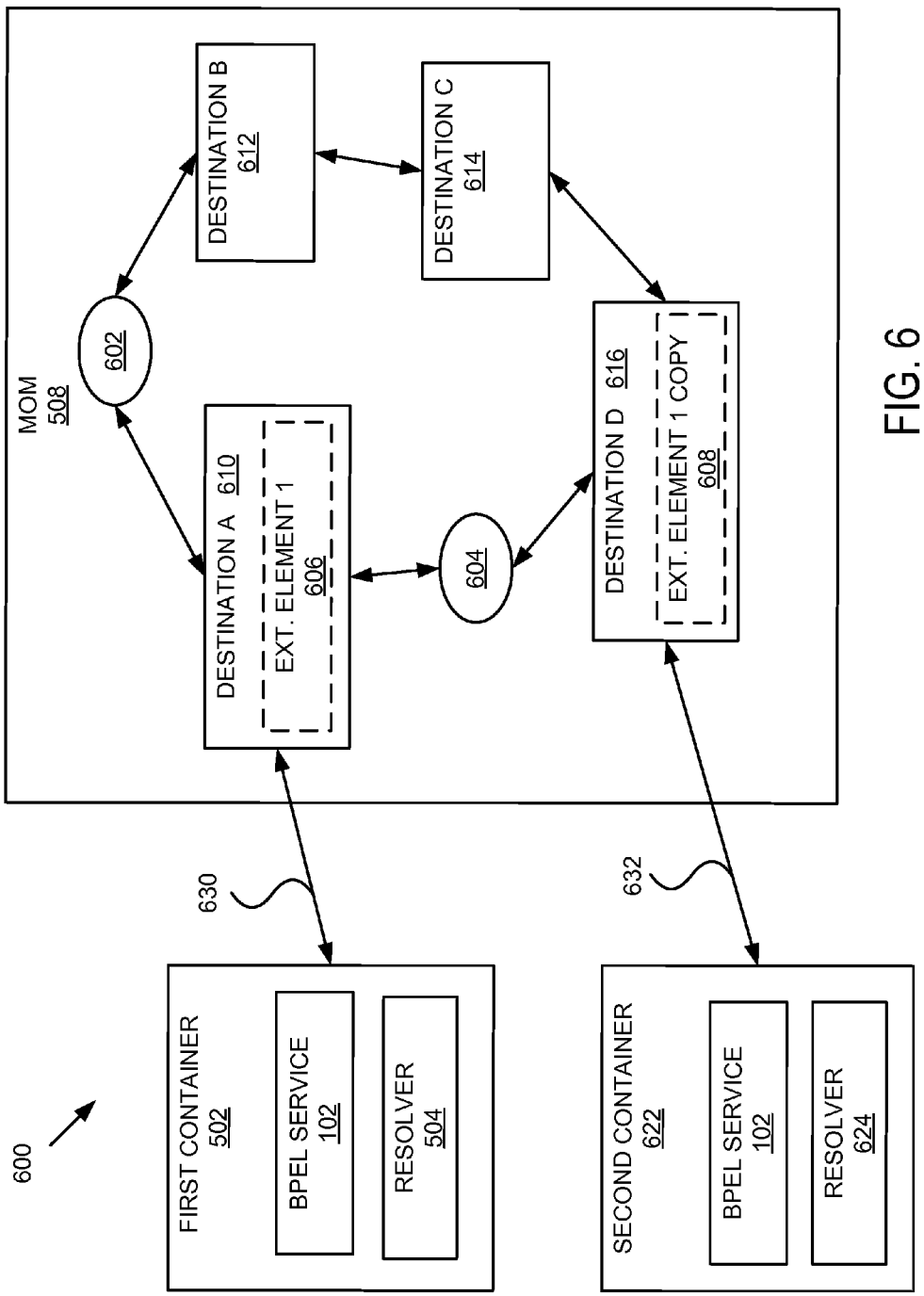
FIG. 6 is a functional block diagram illustrating an example configuration of a plurality of containers and load balancing on multiple destinations in a MOM in accordance with one embodiment.

FIG. 6 is a functional block diagram of an example configuration 600 illustrating an alternate embodiment of the present invention. FIG. 6 shows a plurality of containers 502, 622 and a MOM 508 with a plurality of destinations 610, 612, 614 and 616, illustrating how the present invention can be used for load balancing. In this embodiment, the plurality of containers 502, 622 may both have a need to access an extension element 606, 608, extension element 1. In an embodiment such as shown in FIG. 5, there is only a single extension element 506 and since the logic implemented by extensions can be computationally expensive, the intensive use of the extension element 506 by remote containers taxes the resources where the extension element 506 is located.

The plurality of containers 502, 622 are similar to that described above with reference to FIG. 5. The first container 502 includes a BPEL service 102 and a resolver 504. The first container 502 is adapted for communication with the MOM 508 via signal line 630 coupled to destination A 610. The second container 622 similarly includes a BPEL service 102 and a resolver 624. The second container 622 is adapted for communication with the MOM 508 via signal line 632 coupled to destination D 616.

The MOM 508 includes a plurality of destinations: destination A 610, destination B 612, destination C 614 and destination D 616. The destinations 610, 612, 614 and 616 are coupled for communication with each other. For example, destination A 610 is coupled by a broker 602 to destination B 612. Similarly, destination A 610 is coupled by a broker 604 to destination D 616. Destination C 614 is coupled to destination B 612 and destination D 616. Those skilled in the art will recognize that this coupling of destinations 610, 612, 614 and 616 is only by way of example, and that the destinations 610, 612, 614 and 616 could be coupled in any number of ways.

The extension element 1 606 is located at destination A 610. In order to enable load balancing, a copy of extension element 1 608 is located at destination D 616. The present invention is able to achieve load balancing by replicating extension elements and/or moving them to locations as demands for them changes. Both resolvers 504 and 624 resolve a logical address for extension element 1 606. However, they resolve the logical address to different physical locations. More specifically, resolver 504 will resolve the logical address to the extension element 1 606 at destination A 610, while resolvers 624 will resolve the logical address to the copy of extension element 1 608 at destination D 616. This is advantageous in a number of respects. First, it allows the location extensibility function to be combined with extension replication, such that load balancing of processing by extension elements can be distributed among any number of different locations in the MOM 508. This obviates the need for expensive third party load balancers in the MOM 508. Second, it also optimizes the communication paths such that any particular container can utilize the extension element that is closest (in terms accessibility time) to the container. As shown in FIG. 6, while the second container 622 could use destination A 610 to process the message that invokes extension element 1 606, it instead uses the copy of extension element 1 608 because it avoids having to send the normalized message through broker 604 to destination A 610. Thus, the present invention is advantageous in that the location transparency can be combined with multiple copies of extension elements to provide load balancing of code extensions.

Figure 7:
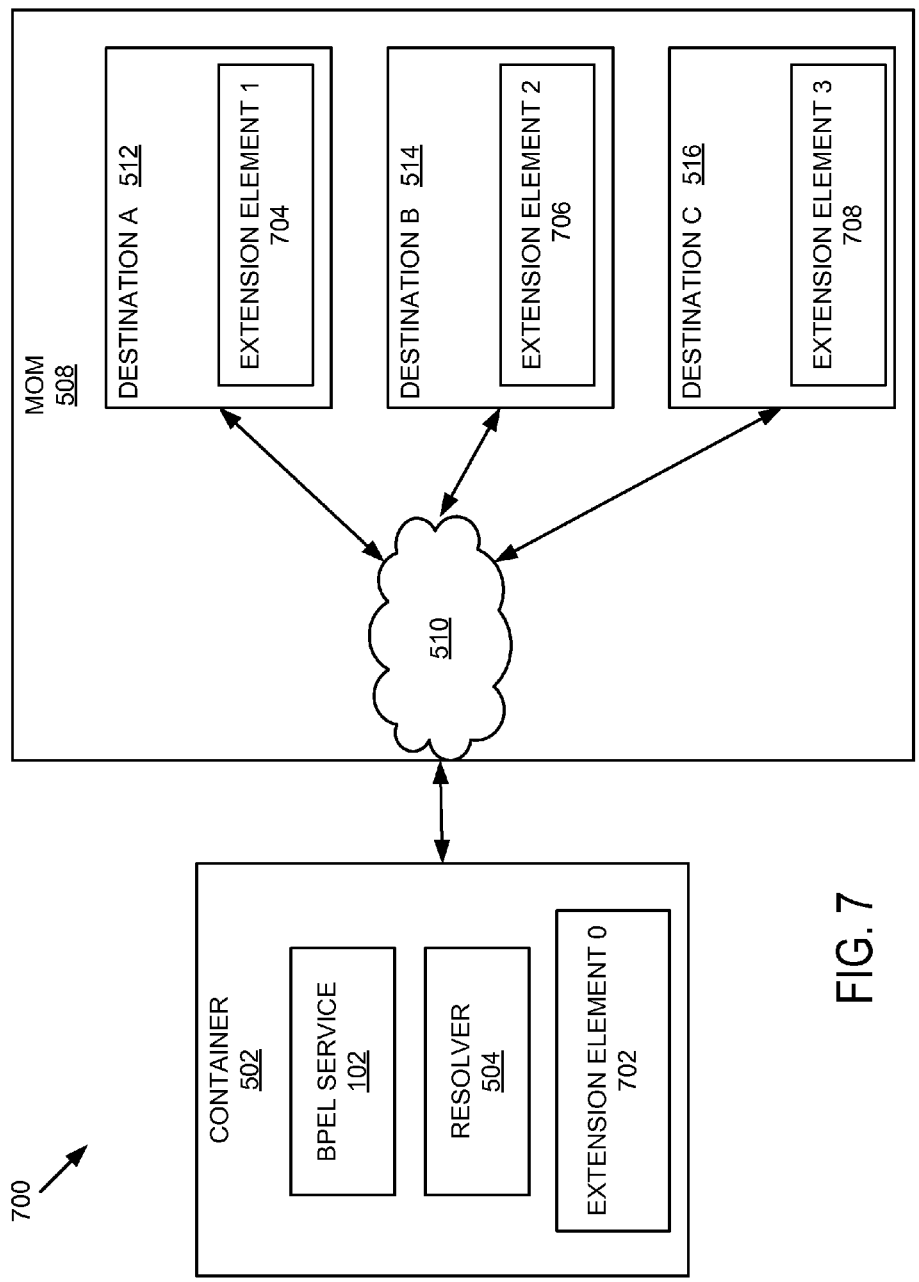
FIG. 7 is a functional block diagram illustrating example functionality of a routing slip in accordance with one embodiment.

FIG. 7 is a functional block diagram 700 illustrating example functionality of a routing slip in accordance with one embodiment. FIG. 7 shows a container 502, which includes a BPEL service 102, resolver 504 and extension element 0 702. The container 502 is adapted for communication with the MOM 508. The MOM 508 includes a network 510 that couples a plurality of destinations 512, 514 and 516, where various extension elements reside. For example, as shown in FIG. 7, extension element 1 704 is located at destination A 512; extension element 2 706 is located at destination B 514; and extension element 3 708 is located at destination C 516.

FIG. 7 illustrates how a routing slip or itinerary is used by the resolver 504 to establish communication between the BPEL service 102 and various extension elements; in this example, extension elements 704, 706 and 708. The routing slip or itinerary defines a series of extension elements that are invoked in a predefined order and the resolver 504 looks for existing extension elements in the order dictated by the routing slip. As shown in FIG. 7, extension elements 702, 704, 706 and 708, which reside at different destinations, are invoked in an order specified by the routing slip or itinerary. For example, as illustrated in FIG. 7, extension element 0 702, which resides in the container 504, is first invoked. Next, extension element 1 704, which resides at destination A 512, is invoked. Subsequently, extension element 2 706, which resides at destination B 514 is invoked. Finally, extension element 3 708, which resides at destination C 516, is invoked. Therefore, FIG. 7 illustrates how the present invention provides routing slip extensibility. The present invention provides the ability to invoke a series of extension elements whereby the first and last invoked extension elements implement the interface, such as the WSDL interface, while the intermediate invoked extension elements are opaque to the BPEL service.

The disclosed embodiments beneficially allow users to define BPEL processes that either execute on a single piece of hardware or across many systems, without modification of the BPEL process or the services which they invoke. This allows dynamic distribution of a user's business process logic by simply changing the location of extension elements. This gives users a tremendous amount of control and flexibility on where logic is executed. This invention also allows the user to provide fine-grained scalability to elements of the BPEL process instances. Finally, one of the benefits of this approach is providing the user with an avenue to scale-out (horizontal scalability) as opposed to other approaches, which only allow the user to scale-up (vertical scalability).

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode or the like. Furthermore, it has also proven convenient at times, to refer to these arrangements of operations as modules, without loss of generality. The described operations and their associated modules may be embodied in software, firmware, hardware or any combinations thereof.

Upon reading this disclosure, those of skill in the art will appreciate still additional alternative structural and functional designs for a system and a process for providing location transparency and scalability for a BPEL process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for orchestrating web services comprising:
performing by a computer system programmed with code stored in a memory and executing by a processor of the computer system to configure the computer system into a machine for:
receiving an input message by a processor executable service of the code, and the processor executable service utilizes an extension element whose address is identified in the input message, wherein the extension element implements computer executable logic;
determining, based on the address identifying the extension element included in the received input message, a location of the extension element; and
responsive to determining the location of the extension element, directing a normalized message to the location of the extension element for processing by the logic of the extension element.

2. The method of claim 1, comprising storing the normalized message in a computer readable storage medium.

3. The method of claim 1, wherein the address is a logical address and determining the location comprises mapping the logical address to a physical address.

4. The method of claim 1, wherein the location is a message oriented middleware destination.

5. The method of claim 1, wherein determining the location comprises resolving the address to an itinerary comprising a plurality of addresses.

6. The method of claim 5, wherein:
the address is a logical address; and
the plurality of addresses is a plurality of physical addresses.

7. The method of claim 1, comprising:
determining whether the input message requires a response; and
annotating the normalized message with an indication that a reply is required.

8. The method of claim 1, comprising:
processing the normalized message with the extension element to generate a reply.

9. The method of claim 8, comprising:
generating an output message including the reply; and
sending the output message.

10. The method of claim 1, wherein the extension element is an extension element for a business process execution language.

11. The method of claim 1, comprising processing the normalized message with the extension element.

12. The method of claim 11, wherein processing is performed at a location remote from receiving, determining and directing.

13. A non-transitory computer readable storage medium configured to store instructions, the instructions when executed by a processor to configure a computer system that includes the processor into a machine to:
receive an input message by a processor executable service of the code, and the processor executable service utilizes an extension element whose address is identified in the input message, wherein the extension element implements computer executable logic;
determine, based on the address identifying the extension element included in the received input message, a location of the extension element; and
responsive to determining the location of the extension element, direct a normalized message to the location of the extension element for processing by the logic of the extension element.

14. The non-transitory computer readable storage medium of claim 13, wherein the address is a logical address and determining the location comprises mapping the logical address to a physical address.

15. The non-transitory computer readable storage medium of claim 13, wherein the location is a message oriented middleware destination.

16. The non-transitory computer readable storage medium of claim 13, wherein determining the location comprises resolving the address to an itinerary comprising a plurality of addresses.

17. The non-transitory computer readable storage medium of claim 16, wherein:
the address is a logical address; and
the plurality of addresses is a plurality of physical addresses.

18. The non-transitory computer readable storage medium of claim 13, further comprising instructions when executed by a processor causing the processor to:
determine whether the input message requires a response; and
annotate the normalized message with an indication that a reply is required.

19. The non-transitory computer readable storage medium of claim 18, further comprising instructions when executed by a processor causing the processor to:
process the normalized message with the extension element to generate the reply.

20. The non-transitory computer readable storage medium of claim 19, further comprising instructions when executed by a processor causing the processor to:
generate an output message including the reply; and
send the output message.

21. The non-transitory computer readable storage medium of claim 13, wherein the extension element is an extension element for a business process execution language.

22. The non-transitory computer readable storage medium of claim 13, further comprising instructions when executed by a processor causing the processor to:
process the normalized message with the extension element.

23. The non-transitory computer readable storage medium of claim 22, wherein processing is performed at a location remote from receiving, determining and directing.

24. A system for providing location extensibility for a business process execution language, the system comprising:
a processor;
a non-transitory computer readable medium, coupled to the processor, storing code executable by the processor to configure the system into a machine that comprises:
a business process execution language service for processing messages and utilizing an extension element whose address is identified in at least one of the messages, wherein the extension element implements computer executable logic;
a resolver for providing a mapping from the address for the extension element to a location of the extension element; and
a container for using the resolver to process the at least one of the messages for directing the processed message to the location of the extension element for processing by the extension element, wherein the container coupled to interact with the resolver and the business process execution language service.

25. The system of claim 24 wherein the address is a logical address and the resolver maps the logical address to a physical address for the location.

26. The system of claim 24 wherein the business process execution language service comprises a script engine for processing a command definition to map a script variable to one or more web services description language parameters.

27. The system of claim 24 wherein the business process execution language service comprises a business process execution language engine for processing a normalized message including invoking the extension element.

28. The system of claim 24 wherein the container includes the extension element.

29. The system of claim 24 wherein the container is adapted to communicate with the extension element, wherein the extension element is at a remote physical location from the container.

30. A method for orchestrating web services comprising:
performing by a computer system programmed with code stored in a memory and executing by a processor of the computer system to configure the computer system into a machine for:
receiving an input message by a processor executable service of the code that utilizes an extension element whose address is identified in the input message, wherein the extension element implements computer executable logic;
determining based on a plurality of a physical addresses included in the received input message, a location of a copy of the extension element of the plurality of copies; and
responsive to determining the location of the copy of the extension element, directing a normalized message to the determined location of the extension element for processing by the logic of the extension element.

31. The method of claim 30, comprising storing the normalized message in a computer readable storage medium.

32. The method of claim 30, wherein the location is a message oriented middleware destination.

* * * * *